(12) United States Patent
Horne et al.

(10) Patent No.: US 9,909,259 B2
(45) Date of Patent: Mar. 6, 2018

(54) SYSTEMS AND METHODS FOR CONTINUOUS MANUFACTURE OF BUCKYPAPER MATERIALS

(71) Applicant: Florida State University Research Foundation, Inc., Tallahassee, FL (US)

(72) Inventors: Gerald Horne, Tallahassee, FL (US); Zhiyong Liang, Tallahassee, FL (US)

(73) Assignee: Florida State University Research Foundation, Inc., Tallahassee, FL (US)

( * ) Notice: Subject to any disclaimer, the term of this patent is extended or adjusted under 35 U.S.C. 154(b) by 150 days.

(21) Appl. No.: 14/972,371

(22) Filed: Dec. 17, 2015

(65) Prior Publication Data

US 2016/0177511 A1    Jun. 23, 2016

Related U.S. Application Data

(60) Provisional application No. 62/093,179, filed on Dec. 17, 2014.

(51) Int. Cl.
| | |
|---|---|
| *D21H 13/50* | (2006.01) |
| *D21F 11/00* | (2006.01) |
| *D21F 9/00* | (2006.01) |
| *B01D 71/02* | (2006.01) |
| *B01D 67/00* | (2006.01) |
| *B82Y 30/00* | (2011.01) |
| *B82Y 40/00* | (2011.01) |

(52) U.S. Cl.
CPC ......... *D21H 13/50* (2013.01); *B01D 67/0004* (2013.01); *B01D 67/0093* (2013.01); *B01D 71/021* (2013.01); *D21F 9/00* (2013.01); *D21F 11/00* (2013.01); *B01D 2323/42* (2013.01); *B82Y 30/00* (2013.01); *B82Y 40/00* (2013.01)

(58) Field of Classification Search
USPC .... 162/100, 118, 152, 157.1, 192, 197, 198, 162/201, 202, 204, 212, 217, 252, 256, 162/263, 283, 289, 294, 380, 387, 388
See application file for complete search history.

(56) References Cited

U.S. PATENT DOCUMENTS

| | | | | |
|---|---|---|---|---|
| 7,459,121 | B2* | 12/2008 | Liang | B01D 67/0046 210/650 |
| 8,058,364 | B2* | 11/2011 | Wang | 106/287.22 |
| 2005/0115575 | A1* | 6/2005 | Seymour | A24C 5/005 131/280 |
| 2006/0207931 | A1 | 9/2006 | Liang et al. | |

(Continued)

OTHER PUBLICATIONS

"Micro and Nano Control Systems", Rockwell Automation, 2011, captured by the Internet Archive Wayback Machine, [online], retrieved from the Internet, [retrieved Jul. 6, 2017], <URL:http://web.archive.org/web/20120108085847/http://ab.rockwellautomation.com/Programmable-Controllers/Micro-and-Nano>.*

(Continued)

*Primary Examiner* — Dennis Cordray
(74) *Attorney, Agent, or Firm* — Eversheds Sutherland (US) LLP (57) ABSTRACT

Systems and methods are provided for producing continuous buckypapers. The systems may permit the in-line characterization and crosslinking of the continuous buckypapers. The systems include roll-to-roll systems in which a continuous buckypaper is created and then separated from the filter paper in an automated process.

20 Claims, 2 Drawing Sheets

(56) References Cited

U.S. PATENT DOCUMENTS

2009/0280324 A1* 11/2009 Liang .................... B29C 70/086
                                                         428/367
2011/0045274 A1*  2/2011 Bao ....................... B82Y 30/00
                                                         428/297.4
2012/0301812 A1   11/2012 Zheng et al.

OTHER PUBLICATIONS

Athalin et al, "A correlated method for quantifying mixed and dispersed carbon nanotubes: Analysis of the Raman band intensities and evidence of wavenumber shift," Journal of Raman spectroscopy (2005) 36:400-408.*
Rodriguez, "Florida State University Libraries Development of an Automated Continuous Buckypaper Production Process," 2008, XP055257203, http://diginole.lib.fsu.edu/islandora/object/fsu:178303/datastream/pdf/download/citation.pdf.
Young, "Florida State University Libraries Continuous Buckypaper Manufacturing Process: Process Investigation and Improvement," 2009, XP055257123, http://diginole.lib.fsu.edu/islandora/object/fsu:169059/datastream/pdf/download/citation.pdf.
PCT International Search Report and Written Opinion for PCT Application No. PCT/US2015/066295 dated Mar. 17, 2016 (13 pages).

\* cited by examiner

SYSTEMS AND METHODS FOR CONTINUOUS MANUFACTURE OF BUCKYPAPER MATERIALS

CROSS-REFERENCE TO RELATED APPLICATION

This application claims priority to U.S. Provisional Patent Application No. 62/093,179, filed Dec. 17, 2014, which is incorporated herein by reference.

GOVERNMENT LICENSE RIGHTS

This invention was made with government support under Grant/Contract Number SNM1344672 awarded by the National Science Foundation. The government has certain rights in the invention.

BACKGROUND

Due to their exceptional mechanical properties, carbon nanotubes are used in high performance structural and multifunctional nanostructural materials and devices. Due in part to the nanostructures of carbon nanotubes, strong interactions, such as van der Waals forces, can occur between nanotubes. As a result, achieving good tube dispersion, desirable tube alignment, and high tube loading in nanocomposites can be exceptionally difficult, if not impossible, when conventional manufacturing methods are used.

Many high performance new nanocomposites having electrical conductivity and/or thermal conductivity could be realized by using a buckypaper or membrane (5-200 µm in thickness) having controlled nanostructures (i.e., dispersion, alignment and/or loading). These buckypapers also could be used to impart macroscale materials with one or more of the advantages associated with nanocomposites.

Although buckypapers can be formed by filtering a suspension of carbon nanotubes (CNTs), the filtration step usually is a slow process due to the nanoscale size of the carbon nanotubes, and nanoscale porous nanostructures of their networks in buckypapers. Also, it can be difficult to produce a buckypaper on a large scale that has consistent properties throughout its structure. Attempts have been made to devise a continuous process for making buckypapers, but the processes typically suffer from one or more disadvantages, including slow production rates, inconsistent quality, the inability to monitor buckypaper quality, the inability to align and/or crosslink the CNTs as part of an in-line process, or a combination thereof.

Although some continuous methods and systems for making buckypapers have been developed, there remains a need to improve these methods and systems. For example, the methods and systems could be designed to be easier to operate, provide more control over the properties of the resulting buckypapers, allow for in-line crosslinking and/or alignment of the CNTs, produce continuous buckypapers at a faster rate, and/or continuously monitor the qualities of the buckypapers.

BRIEF SUMMARY

Provided herein are systems and methods for making continuous buckypaper materials. In embodiments, the systems provided herein comprise a suspension tank containing a suspension of CNTs, and a filtration unit comprising (i) a suspension chamber in fluid communication with the suspension tank, (ii) a filter paper associated with two or more pinch rollers, (iii) a filtration area associated with a vacuum pump, (iv) a drying area, and (v) a roll for collecting a continuous buckypaper. The systems also may include various controllers, which permit one or more portions of the system to be automated. Therefore, in particular embodiments, a continuous buckypaper may be produced and collected automatically.

In embodiments, the methods provided herein for the continuous manufacture of a buckypaper comprise (1) providing a suspension of CNTs in a suspension tank, (2) transferring the suspension of CNTs in the suspension tank to a suspension chamber of a filtration unit comprising a filtration area, (3) contacting the filtration area and the suspension of CNTs in the suspension chamber with a first portion of a filter paper provided by two or more rollers, (4) applying vacuum pressure to the filtration area to form a portion of a continuous buckypaper on the portion of the filter paper, (5) advancing the two or more rollers to contact the filtration area with a second portion of the filter paper, and (6) drying the portion of the continuous buckypaper. In particular embodiments, one or more of these steps is part of an in-line process.

DETAILED DESCRIPTION

Generally, the systems and methods provided herein may be used to create continuous buckypaper materials. The systems and methods provided herein allow for [1] the production of continuous buckypapers, [2] the in-line characterization of the continuous buckypapers, [3] the crosslinking of CNTs through UV irradiation, and/or [4] the alignment of CNTs in the continuous buckypapers through mechanical stretching or subjecting a suspension of CNTs to a magnetic force or electrical field. The crosslinking of CNTs through UV irradiation may be done as part of the in-line processes provided herein because the use of UV irradiation avoids the lengthy and costly chemical treatment processes usually used to crosslink CNTs. Moreover, the systems and methods provided herein include an automated filtration process. For example, the movement of the filter paper may be automatically controlled and the continuous buckypaper may be automatically separated from the filter paper.

The systems and methods provided herein may continuously produce buckypaper materials at a relatively fast rate compared to conventional setups. In embodiments, the systems and methods provided herein continuously produce buckypaper materials at a rate of from about 1 foot per hour to about 10 feet per hour. In one embodiment, the systems and methods herein continuously produce buckypaper materials at a rate of about 5 feet per hour.

The continuous buckypaper materials may have a width of from about 3 to about 12 inches, or longer depending on the size of the rollers and/or filter paper used in the systems and methods provided herein. In one embodiment, the continuous buckypaper materials have a width of about 6 inches.

The continuous buckypaper materials may have a length of from about 10 to about 300 feet, or longer depending on the size of the collection roller used to collect the continuous buckypaper materials, and/or the length of the filter paper.

The continuous buckypaper materials may have an areal density of from about 1 to about 20 g/m$^2$ (GSM). In embodiments, continuous buckypaper materials have an areal density of from about 2 GSM to about 10 GSM. In one embodiment, the continuous buckypaper materials have an areal density of about 5 GSM. In a particular embodiment, the continuous buckypaper materials have an areal density of about 10 GSM. The areal density may be adjusted by tailoring the concentration of the CNT suspension, filtration speed, filtration duration, or a combination thereof.

In embodiments, the continuous buckypaper materials have a width of from about 3 to about 12 inches, a length of from about 10 to about 50 feet, and an areal density of from about 5 to about 10 GSM.

Figure 1:
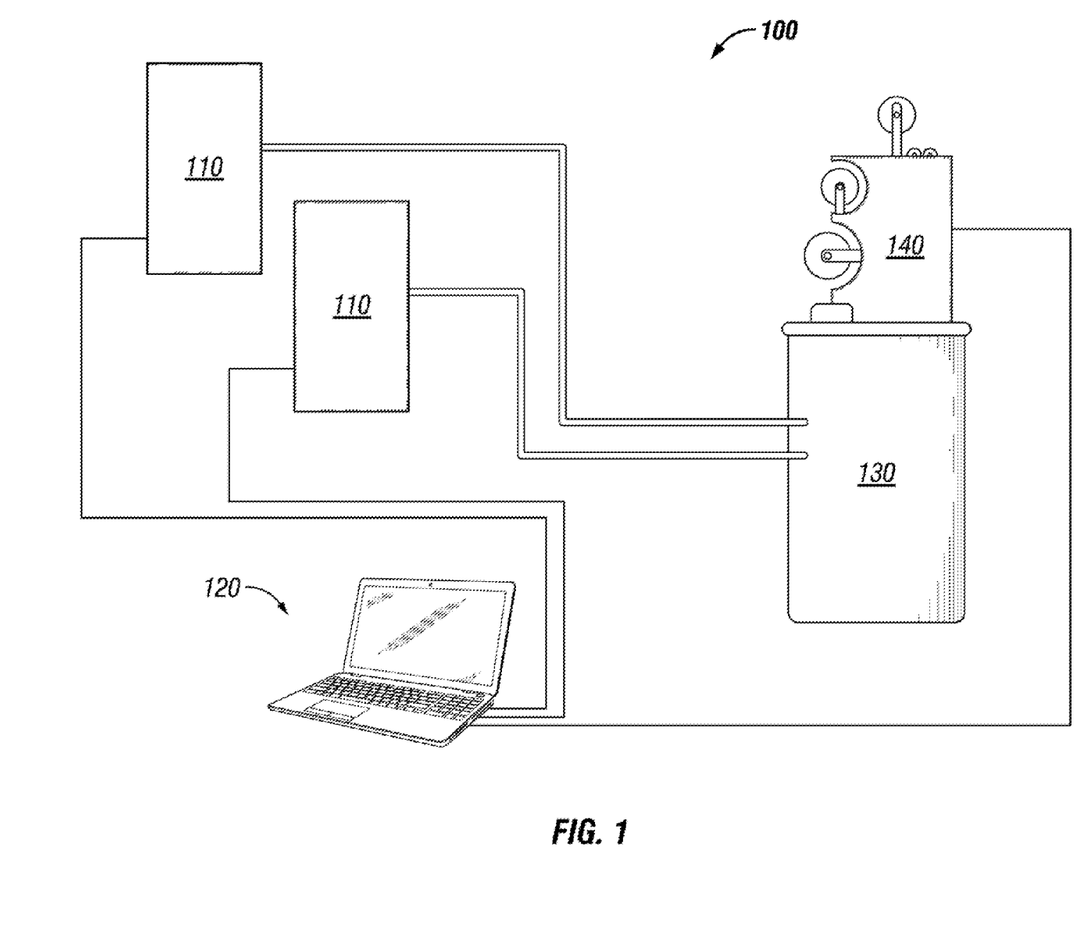
FIG. 1 is a schematic of an embodiment of a system comprising two sonication units, a suspension tank, a filtration unit, and a controlling computer.

One embodiment of a system for producing continuous buckypapers is depicted at FIG. 1. The system 100 of FIG. 1 includes two sonication units 110 that are in fluid communication with a suspension tank 130. The suspension tank contains a suspension of CNTs. In the system of FIG. 1, each sonication unit 110 is connected with a tube to the suspension tank 130. Other configurations, however, are possible, as provided herein. The suspension tank 130 is in fluid communication with the filtration unit 140, which is connected and controlled, along with the sonication units 110, by a controlling computer 120.

Figure 2:
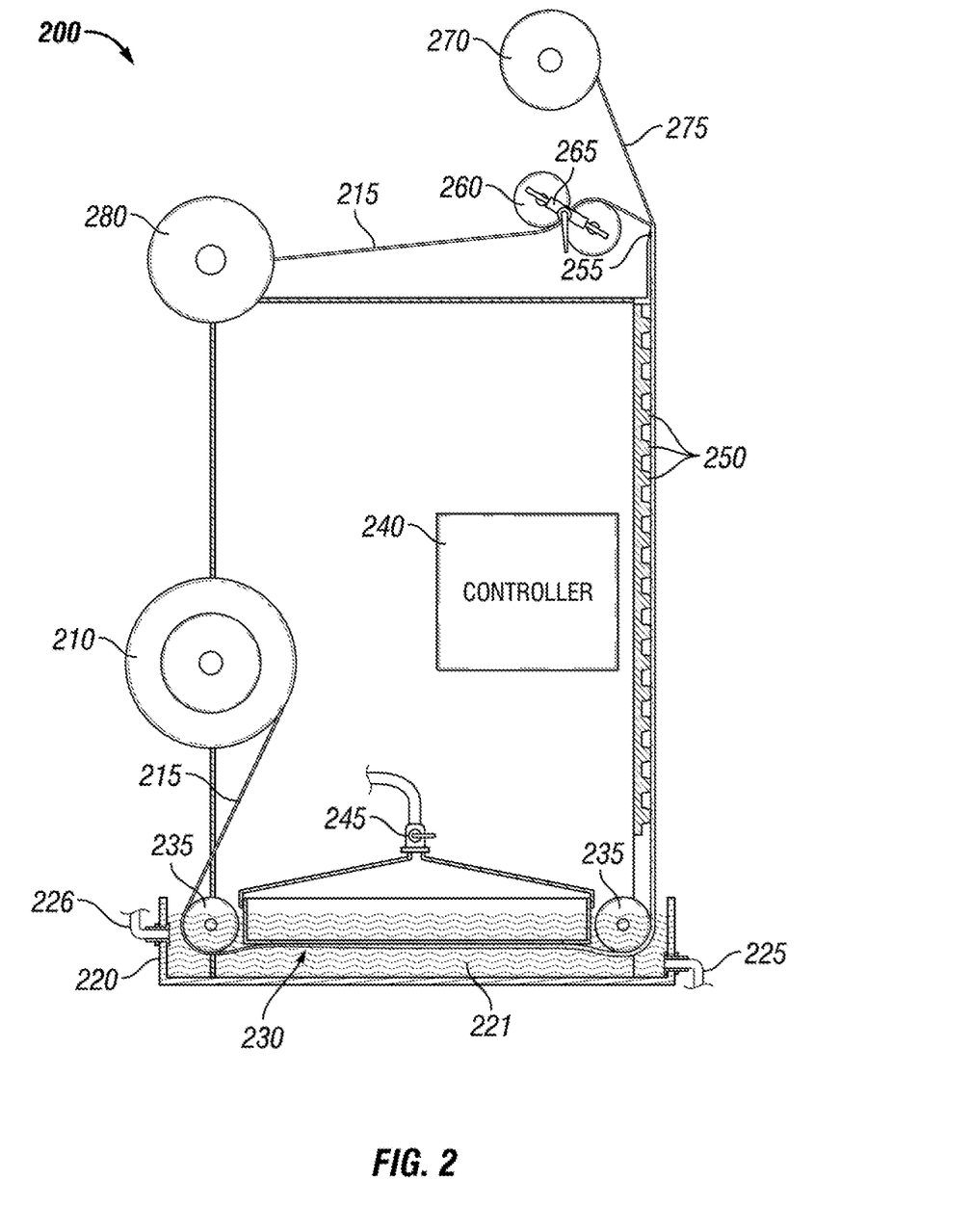
FIG. 2 is a schematic of one embodiment of a filtration unit for producing continuous buckypapers.

A detailed schematic of the filtration unit 140 of FIG. 1 is depicted at FIG. 2. The filtration unit 200 of FIG. 2 includes a suspension chamber 220 that is in fluid communication with the suspension tank 130 of FIG. 1 via a connecting tube 225. The suspension chamber 220 also includes a fill line 226 that prevents the suspension of CNTs 221 from filling the suspension chamber 220 beyond the fill line 226. The system 200 includes a collecting roller 210 of filter paper 215. The filter paper 215, as the pinch roller 260 is activated, is advanced to the filtration area 230. The filtration area 230 is a porous plate flanked by two guiding rollers 235 that ease the advancement of the filter paper 215. When vacuum pressure is applied through the vacuum control valve 245, CNTs are deposited on the portion of the filter paper 215 operably associated with the filtration area 230. The pinch roller 260 is then advanced, and the portion of the filter paper 215 onto which CNTs have been deposited is advanced to the drying area having substantially raised portions 250. The pinch roller 260 is then advanced. As the filter paper 215 is pulled over the knife separator 255, the filter paper 215 is separated from the continuous buckypaper 275, which is collected on a collecting roller 270. The used filter paper 215 is collected on a separate collecting roller 280. The pinch roller 260 is controlled with a tension control device 265. The tension control device 265 and the vacuum control valve 245 are controlled by the controller 240, which may be operably connected to the controlling computer 120 depicted at FIG. 1.

The systems and methods provided herein improve upon those described by U.S. Pat. No. 7,459,121, which is incorporated herein by reference. The systems and methods provided herein also are capable of efficiently producing thin, lightweight continuous buckypaper materials having a high purity, high electrical conductivity, or a combination thereof. The systems and methods herein also may be automated, completely or in part, including, for example, the steps of separating (from a filter paper) and collecting a continuous buckypaper.

As used herein, the phrase "buckypaper materials" and the term "buckypaper(s)" refer to film-shaped networks of nanoscale fibers. As used herein, the phrases "continuous buckypaper materials" or "continuous buckypaper(s)" refer to buckypapers made by the methods and systems provided herein.

Provided herein are systems for the manufacturing of continuous buckypaper materials. The systems generally comprise (1) a suspension tank containing a suspension of CNTs, and (2) a filtration unit comprising (i) a suspension chamber in fluid communication with the suspension tank, (ii) a filter paper associated with two or more rollers, (iii) a filtration area associated with a vacuum pump, (iv) a drying area, and (v) a roll for collecting a continuous buckypaper.

Suspension Tank

The systems provided herein include a suspension tank, which includes a suspension of CNTs. The suspension of CNTs generally comprises a nonsolvent and CNTs. The CNTs, in embodiments, are at least substantially evenly dispersed in the nonsolvent. In other embodiments, the CNTs are not evenly dispersed in the nonsolvent. In some embodiments, the suspension of CNTs comprises a nonsolvent, CNTs, and at least one surfactant. In further embodiments, the suspension of CNTs comprises a nonsolvent, CNTs, at least one surfactant, and at least one additive. The at least one additive may include one or more stabilizers, particles, including nanoparticles, a polymer precursor, etc. The suspension of CNTs may be formed by any means known in the art, including subjecting the CNTs and nonsolvent to agitation, such as stirring, sonication, or a combination thereof.

The concentration of CNTs in the nonsolvent may be selected, in part, to produce a continuous buckypaper having a desired areal density. For example, the concentration of CNTs in the suspension of CNTs may be increased as part of an effort to produce continuous buckypapers having a relatively higher areal density. The concentration of CNTs in the nonsolvent may be from about 1 mg/L to about 500 mg/L. In one embodiment, the concentration is from about 25 mg/L to about 150 mg/L. In another embodiment, the concentration is from about 40 mg/L to about 100 mg/L.

As used herein, the term "nonsolvent" refers to liquid media that essentially are non-reactive with the CNTs and in which the CNTs are virtually insoluble. Examples of suitable nonsolvent media include water, one or more volatile organic liquids, and mixtures thereof. Examples of volatile organic liquids include acetone, ethanol, methanol, n-hexane, ether, acetonitrile, chloroform, dimethylformamide (DMF), and mixtures thereof. In embodiments, the nonsolvent is a low-boiling liquid. It is believed that low-boiling liquids, in some embodiments, permit the nonsolvent to be easily and quickly removed, thereby facilitating drying of the continuous buckypapers.

In embodiments, the suspension of CNTs includes one or more surfactants. The one or more surfactants, for example, may include dispersants, anti-flocculants, or a combination thereof. Not wishing to be bound by any particular theory, it is believed that one or more surfactants may be used to maintain the suspension of CNTs to facilitate continuous buckypaper formation, dewatering of the continuous buckypapers, or a combination thereof. Particular examples of one or more surfactants include Triton™ X-100 (ThermoFisher Scientific, USA), dodecylbenzenesulfonic acid sodium salt (NaDDBS), and sodium dodecyl sulfate (SDS).

The CNTs herein are nanoscale fibers. As used herein, the phrase "nanoscale fibers" refers to a thin, greatly elongated solid material, typically having a cross-section or diameter of less than 500 nm. In embodiments, the nanoscale fibers include single wall carbon nanotubes (SWNTs), multiplewalled carbon nanotubes (MWNTs), carbon nanofibers, and combinations thereof. In some embodiments, the CNTs are SWNTs. In particular embodiments, the CNTs are MWNTs. In still further embodiments, the CNTs are a mixture of SWNTs and MWNTs. In additional embodiments, the CNTs are a mixture of SWNTs, MWNTs, and carbon nanofibers.

As used herein, the phrase "carbon nanotubes" and the abbreviation "CNTs" generally refer to tubular graphite, which may be capped with fullerene structures. The CNTs may be a synthetic material having a wide molecular weight range that depends substantially on the diameter and length of the CNTs. CNTs are commercially available from companies such as General Nano, LLC (Cincinnati, Ohio, USA), or can be made using techniques known in the art. The CNTs can be pristine, in which the carbon fullerene tubes have fullerene end caps, or the CNTs can be non-pristine, for example, where the pristine CNTs have been chemically or mechanically chopped and then optionally functionalized to convert dangling carbon atoms to different functional groups, such as carbonyl or other oxygen containing groups. The sidewalls of the CNTs also may be functionalized to include one or more functional groups. The CNTs, in embodiments, also include one or more other nanomaterials, such as graphene, metal nanoparticles, or a combination thereof. In embodiments, the CNTs are pristine MWNTs. In other embodiments, the CNTs are non-pristine MWNTs. In some embodiments, the CNTs include a mixture of pristine MWNTs and pristine SWNTs. In still further embodiments, the CNTs include a mixture of pristine MWNTs and non-pristine SWNTs, or vice versa. In one embodiment, the CNTs are pristine SWNTs. In another embodiment, the CNTs are non-pristine SWNTs. In each of the foregoing embodiments, the sidewalls of at least a portion of the SWNTs, MWNTs, or a combination thereof may be functionalized.

As used herein, the phrase "carbon nanofibers" refers to filamentous fibers that resemble whiskers of multiple graphite sheets or MWNTs.

In embodiments, the suspension tank is associated with at least one sonicator. The at least one sonicator may be fixably mounted, detachably mounted, or arranged in a position relative to the suspension tank that permits sonication to assist in the formation of the suspension, maintenance of the suspension, or a combination thereof.

In embodiments, the systems provided herein include at least one sonication unit. The sonication unit typically includes at least one reservoir associated with at least one sonicator. The sonication unit may be in fluid communication with the suspension tank. In embodiments, one or more pumps or other devices may be used to transfer the at least one nonsolvent and CNTs between or among the suspension tanks and one or more sonication units. As a result, a continuous sonication process may be used to prepare a high-quality CNT suspension of any desired volume. In one embodiment, the at least one sonication unit can be used to produce up to 300 L/day of a well-dispersed suspension of CNTs.

The at least one sonicator may be fixably mounted, detachably mounted, or arranged in a position relative to the at least one reservoir of the sonication unit that permits sonication to assist in the formation of the suspension, maintenance of the suspension, or a combination thereof. The sonication unit also may include at least one apparatus for agitating, e.g., stirring, the contents of the at least one reservoir.

In one embodiment, the reservoir of the sonication unit has a smaller volume than the suspension tank. It is believed that the relatively smaller volume of the reservoir of the sonication unit increases the effectiveness of sonication. In some embodiments, the systems provided herein include two or more sonication units, each having a reservoir of a smaller volume than the suspension tank.

In embodiments, the systems provided herein include two or more sonication units, each of which is in fluid communication with the suspension tank. Each of the two or more sonication units may be directly connected to the suspension tank via a tube or otherwise. Alternatively, two or more sonication units may be connected to each other via a tube or otherwise, while one of the two or more sonication units is connected with the suspension tank via a tube or otherwise.

The sonicators and sonication units used in the systems provided herein may be any of those known in the art. In embodiments, the one or more sonication units are Flocell® sonicators. For example, a 0.5" Flocell® from Qsonica (Newtown, Conn., USA) may be used. In another embodiment, a Flocell® 0.5" sonicator with adequate cooling (<22° C.) is used to provide continuously a fresh CNT suspension at low temperatures, which are effective to avoid re-aggregation of the CNTs.

In embodiments, the systems provided herein include devices that permit in-line characterization and monitoring of the suspensions of CNTs. The in-line characterization may be used continuously to monitor and quantify the efficiency of suspension formation during the sonication process, whether the sonication is performed while the nonsolvent and CNTs are disposed in a suspension tank, sonication unit, or both. The in-line characterization may rely on any instruments known in the art. For example, the in-line characterization may be performed by connecting one or more sonication units or a suspension tank to a peristaltic pump, an instrument for performing dynamic light scattering analysis (e.g., Beckman Coulter DelsaNano C), and/or a UV-Vis-NIR spectrophotometer (Cary 5000 UV-Vis-NIR). In one embodiment, the in-line characterization and monitoring of the suspensions of CNTs is performed with a closed-loop monitoring setup that cycles a sample of the suspension of CNTs among a sonication unit or suspension tank, a peristaltic pump, a dynamic light scattering analyzer, and a UV-Vis-NIR spectrophotometer. Based on the data collected with the in-line characterization system, the parameters associated with suspension formation may be adjusted as needed or desirable. The parameters associated with suspension formation may include, but are not limited to, the concentration of CNTs in the nonsolvent, the intensity and/or duration of sonication, the intensity and/or duration of agitation, the frequency of suspension rotation between and among one or more sonication units and the suspension tank.

Filtration Unit

In embodiments, the suspension tank is in fluid communication with a filtration unit, which forms continuous buckypapers.

The filtration unit includes a suspension chamber. The suspension chamber typically includes a reservoir having dimensions that permit the separation of the nonsolvent and CNTs according to the methods provided herein. The reservoir of the suspension chamber may have an opening on its top side that permits a filtration area and filter paper of a desired size to be brought into contact with the suspension of CNTs. In embodiments, the opening on the top side of the reservoir of the suspension chamber substantially corresponds to the dimensions of the filtration area and filter paper. The reservoir of the suspension chamber may be of any depth that permits the formation of continuous buckypapers according to the methods provided herein. It is believed, however, that a relatively shallow reservoir may prevent or reduce re-aggregation by limiting the time that the suspension of CNTs spends in the suspension chamber before buckypaper formation. By minimizing idle time in the suspension chamber, it is believed that the quality of the CNT suspension can be maintained more easily.

In embodiments, the suspension chamber is in fluid communication with the suspension tank. At least one pump or other means may be used to transfer the suspension of CNTs from the suspension tank to the suspension chamber.

The suspension chamber generally should be filled with an amount of the suspension of CNTs that permits the continuous buckypaper materials to be formed. In one embodiment, the suspension of CNTs may be pumped from the suspension tank until the suspension chamber is completely filled, or partially filled, as desired. The desired fill level may be indicated by the flow of the suspension of CNTs out of one or more return lines and back into the suspension tank.

The CNTs in the suspension chamber may be aligned prior to buckypaper formation. The CNTs may be aligned with a magnetic force, an electrical force, other means known in the art, or a combination thereof. In embodiments, the suspension chamber is associated with at least one device for applying a magnetic force, such as a magnet, or an electrical field. The at least one device for applying a magnetic force or electrical field may be fixably mounted, detachably mounted, or arranged in or near the suspension chamber. In one embodiment, at least a portion of the CNTs are functionalized with one or more functional groups capable of responding to a magnetic force, an electrical field, or a combination thereof in a manner that permits or eases the substantial alignment of the CNTs.

The filtration unit also includes a filtration area. The filtration area generally supports a portion of the filter paper while the nonsolvent and CNTs are separated. The filtration area generally may be made of any material, such as metal, plastic, or a combination thereof, that is capable of supporting a portion of the filter paper during the methods provided herein. The filtration area should be permeable to the nonsolvent; therefore, in some embodiments, the filtration area is porous. The filtration area, in embodiments, includes a porous plate that supports a portion of the filter paper. In other embodiments, the filtration area includes a screen or mesh. The portion of the filtration area that is permeable to the nonsolvent should at least substantially conform to the size, i.e., width, of the filter paper so that the filter paper covers the entire permeable portion of the filtration area. For example, when a filter paper having a width of 6.5 inches is used, the permeable portion of the filtration area have a corresponding width of 6.0 inches.

In embodiments, the first side of the filtration area supports a portion of the filter paper, and the second side of the filtration area is associated with a vacuum pump. In one embodiment, the vacuum pump is connected with a tube to the filtration area. The tube may have an end or be fitted with an attachment that is capable of applying negative pressure to all or at least a portion of the filtration area. The attachment, for example, may resemble a suction cup or other apparatus that is sized to at least substantially conform at least with the permeable portion of the filtration area. In another embodiment, the filtration area itself is shaped in a manner that permits a single vacuum tube, or a vacuum suspension valve, to be attached to it in order to apply negative pressure to substantially all of the portion of the filtration area that supports the filter paper. The vacuum pump, in particular embodiments, is controlled with a vacuum suspension valve. The vacuum suspension valve may be incorporated into a tube that connects the vacuum source to the filtration area, or the vacuum suspension valve may be disposed between the tube and the filtration area.

The vacuum pump, in some embodiments, provides negative pressure, which moves the nonsolvent in the suspension chamber through the filter paper, through the filtration area, and out of the suspension chamber. As the nonsolvent is evacuated, at least a portion of the CNTs are deposited on the filter paper as a buckypaper material. The nonsolvent evacuated from the suspension chamber may be discarded, or returned to the suspension tank, sonication unit, or a combination thereof.

The filtration area may be arranged in the suspension chamber so that the portion of the filter paper supported by the filtration area is at least partially submerged in the suspension of CNTs when the suspension chamber is filled to its desirable level. The filtration area may be mounted on an adjustable bracket to permit its position in the suspension chamber to be altered. In embodiments, the filtration area is a porous plate arranged substantially parallel to the bottom of the suspension chamber, the bottom side of the plate supports a portion of the filter paper, and the top side of the plate is associated with a vacuum pump. Therefore, in some embodiments, the vacuum pressure is applied above the filter paper, which is arranged at or near the top of the suspension. This arrangement is believed to reduce large particle deposition and/or facilitate the formation of buckypapers on the filter paper.

The filtration area may have one or more portions shaped in a way that reduces the likelihood of damaging the filter paper as it is advanced or stretched. For example, the filtration area may have one or more curved or beveled edges.

The filtration unit also includes filter paper that is associated with two or more rollers. The two or more rollers may include collection rollers, guiding rollers, pinch rollers, or a combination thereof. The two or more rollers may be arranged at any positions within the systems provided herein, as long as the arrangement of the two rollers permits the filter paper to be advanced to the filtration area and drying area.

In embodiments, the two or more rollers include two collection rollers. The first of the two collection rollers may include unused filter paper that is advanced to the filtration area. The second of the two collection rollers may collect the used filter paper. The used filter paper may be associated with the continuous buckypaper. In some embodiments, the systems include three collection rollers: a first that includes unused filter paper, a second that collects used filter paper, and a third that collects the continuous buckypaper that has been separated from the filter paper.

In embodiments, the two or more rollers include at least six rollers: three collection rollers, at least two guiding rollers, and at least one pinch roller. The two guiding rollers may flank the filtration area to guide the filter paper from the first collection roller to the filtration area, and from the filtration are to the drying area. The pinch roller may pull the filter paper over a knife separator to separate the continuous buckypaper, which is collected by the second collection roller. The separated filter paper is collected by the third collection roller. One or more additional guiding rollers and/or pinch rollers may be positioned in the systems.

In embodiments, the one or more pinch rollers in the systems provided herein may be associated with a tension control device. The tension control device may be monitored and/or controlled by a microcontroller and/or computer. The tension control device may be used to advance the filter paper through the system, apply or maintain tension in the filter paper, apply stretching force to the filter paper and/or continuous buckypaper, or a combination thereof.

The phrase "filter paper," as used herein, refers to a flexible, sheet-like filtering material. The film-shaped filtering material may be made of any suitable material. For example, the sheet-like filtering material may be made of paper, glass, other fibers, or a combination thereof. In may comprise a woven or non-woven fabric. In one embodiment, the filter paper has a degree of elasticity that permits it to be stretched along with the buckypaper materials without substantially damaging the filter paper. The pore size of the filter paper may be selected based on the content of the suspension of CNTs. In embodiments, the pore size of the filter paper ranges from about 0.45 micrometers to about 100 micrometers. In one embodiment, the pore size is about 0.45 micrometers.

Generally, the width of the continuous buckypaper materials created by the systems and methods herein is limited only by the size of the systems' components, such as the filter paper. In embodiments, the width of the continuous buckypaper materials is from about 1 inch to about 36 inches. In one embodiment, the width of the continuous buckypaper materials is about 6 inches. The continuous buckypaper materials may be of any desired length. The only limitation on the length of a continuous buckypaper produced by the methods provided herein is the length of the filter paper. For example, the continuous buckypaper materials created by the systems and methods herein may be 30 feet long.

The filtration unit also may include a drying area. The drying area may be arranged in-line with one or more of the other components of the systems provided herein. As used herein, the terms "dry" or "drying" refer to the removal of at least a portion of the residual nonsolvent from the CNTs of the continuous buckypaper by active means, passive means, or a combination thereof. The phrase "residual nonsolvent" refers to nonsolvent not separated from the CNTs by the vacuum pressure applied to the filtration area. The drying area may be arranged in the system so the filter paper passes from the filtration area to the drying area as it is advanced by the two or more rollers.

In one embodiment, the drying area comprises substantially raised portions in contact with the filter paper. The substantially raised portions may include grooves, ridges, bumps, etc. It is believed that the substantially raised portions may reduce surface tension between the drying area and the filter paper during drying and advancement of the filter paper by the two or more rollers. Also, it is believed that the drying area having substantially raised portions enables a fast drying process.

In embodiments, the systems provided herein may include a fan or other means for circulating air. The fan or other means for circulating air may be used to dry or to assist with drying the continuous buckypapers. For example, a fan may be mounted in the system to blow air on or circulate air around a continuous buckypaper. The fan may be used to dry or to assist with drying a portion of the continuous buckypapers that is positioned at or near the drying area.

The filtration units provided herein also may include a device for separating the filter paper from the continuous buckypaper materials. The continuous buckypaper materials may then be continuously collected on a buckypaper materials collection roll. In embodiments, the device for separating the filter paper from the continuous buckypaper materials is a knife separator. The collection rollers for collecting used filter paper and the continuous buckypaper may be positioned within the systems herein so that the angle between the used filter paper and continuous buckypaper, after separation, is from about 20 to about 90 degrees. The knife separator may permit in-line automatic separation of the continuous buckypaper materials from the filter paper. Other separating means known in the art, however, may be used and included in the filtration unit.

Not wishing to be bound by any particular theory, it is believed that the fast drying process permitted by the drying area having substantially raised portions, and the in-line automatic separation of the continuous buckypaper materials and filter paper may minimize the processing stresses, such as uniform shrinkage during drying and uneven "peeling off" stress. Minimizing these stresses may permit the production of more consistent products with fewer defects.

The systems and methods provided herein may be automated, including, for example, at pilot or industrial scale. In embodiments, the systems and methods herein include or rely upon one or more computers, such as a process control computer. In some embodiments, the systems and methods herein include or rely upon at least one microcontroller. In particular embodiments, the systems and methods herein include or rely upon one or more computers and one or more microcontrollers. A microcontroller may be used to control at least one of the following: the flow rate of the suspension of CNTs, vacuum pressure, the speed of filtration, the duration of filtration, drying the continuous buckypapers, separating the continuous buckypapers and filter paper, mechanically stretching the continuous buckypapers, and rewinding/collecting the continuous buckypapers. In embodiments, the at least one microcontroller includes a Micro PLC Controller which controls [1] filter paper movement, [2] a vacuum suspension valve, which controls the pressure applied by the vacuum pump, and/or [3] one or more of the other steps or procedures provided herein.

In embodiments, the systems provided herein include one or more devices for continuously monitoring the buckypaper materials. In one embodiment, the systems include an in-line Raman characterization setup to characterize and monitor the continuous buckypapers produced by the systems and methods provided herein. The in-line Raman characterization setup may include one or more of the following: a polarizer, an adjustment apparatus, such as a screw, for Z-distance control, an objective lens, and a sample roller.

In embodiments, the systems provided herein include a UV irradiation source. The UV irradiation source may be arranged so that the buckypaper materials produced by the systems provided herein are exposed to the irradiation. The exposure may occur after the continuous buckypaper materials have been dried at the drying area. The continuous buckypaper materials may be subjected to an amount of UV irradiation sufficient to crosslink at least a portion of the CNTs. In a particular embodiment, the UV irradiation crosslinks the CNTs with π-conjugated molecule, such as polydiacetylene. Not wishing to be bound by any particular theory, it is believed that crosslinking the CNTs may enhance electrical conductivity and/or load transfer.

Methods of Making Continuous Buckypapers

Also provided herein are methods of making continuous buckypaper materials. In embodiments, the methods comprise (1) forming a suspension of CNTs in a suspension tank, (2) transferring the suspension of CNTs in the suspension tank to a suspension chamber of a filtration unit comprising a filtration area, (3) contacting the filtration area and the suspension of CNTs in the suspension chamber with at least a portion of a filter paper provided by two or more rollers, (4) applying vacuum pressure to the filtration area to form a portion of a continuous buckypaper on the filter paper, (5) drying the portion of the continuous buckypaper, and (6) separating the continuous buckypaper from the filter paper. These method steps may be conducted in a continuous or semi-batch process.

After the buckypaper has been separated from the filter paper, the buckypaper may be collected on one or more rollers to realized a roll-to-roll process.

In embodiments, one or more steps of the methods provided herein are controlled by a microprocessor. The microprocessor may permit one or more steps to be automated. Therefore, in one embodiment, at least one of the steps provided herein, such as forming, transferring, contacting, applying, drying, separating, collecting, advancing, etc., is automated.

Generally, forming the suspension of CNTs in the suspension tank comprises disposing CNTs in a nonsolvent, and subjecting the CNTs and nonsolvent to agitation, sonication, or a combination thereof. Agitation may include stirring, shaking, etc. In one embodiment, the CNTs and nonsolvent are subjected to agitation, sonication, or a combination thereof while in a suspension tank. Therefore, the suspension of CNTs may be formed and/or maintained while the CNTs and nonsolvent are in the suspension tank.

In another embodiment, forming the suspension of CNTs in the suspension tank includes transferring CNTs and a nonsolvent from the suspension tank to one or more sonication units in fluid communication with the suspension tank. After the suspension is transferred to the one or more sonication units, the suspension may be returned to the suspension tank. In some embodiments, forming the suspension of CNTs in the suspension tank comprises disposing CNTs and a nonsolvent in one or more sonication units, and then transferring the suspension to the suspension tank. In embodiments in which one or more sonication units are used, the suspension may be continuously transferred between and/or among the one or more sonication units and the suspension tank.

In embodiments, the methods provided herein include continuously characterizing and/or monitoring the suspension of CNTs. An in-line characterization may be used to monitor continuously and quantify the efficiency of suspension formation during the sonication process. The in-line characterization may rely on any instruments known in the art. For example, the in-line characterization may be performed by connecting to at least one of the sonication units or suspension tank a peristaltic pump, an instrument for performing dynamic light scattering analysis (e.g., Beckman Coulter DelsaNano C), and/or a UV-Vis-NIR spectrophotometer (Cary 5000 UV-Vis-NIR).

Generally, the suspension of CNTs and nonsolvent in the suspension tank is transferred to a suspension chamber of a filtration unit comprising a filtration area. This transfer may be achieved by gravity, a pump, or any other means known in the art, and may be made possible by arranging the suspension tank and suspension chamber in fluid communication with each other. The pump or other means used to transfer the suspension of CNTs and nonsolvent may be controlled with a microcontroller or other means known in the art.

The amount of the suspension of CNTs and nonsolvent that is transferred from the suspension tank to the suspension chamber should be an amount sufficient to fill the suspension chamber to a desirable level. The desirable level, in embodiments, is the level necessary to submerge, completely or partially, the filter paper supported by the filtration area. In one embodiment, the suspension chamber is fitted with a fill line, which may prevent the suspension chamber from being filled beyond a certain level. The fill line may be constructed so that the excess suspension is discarded or returned to the suspension tank or one or more sonication units. The fill line may permit the suspension of CNTs to be transferred continuously from the suspension tank to the suspension chamber so that the level of the suspension of CNTs in the suspension chamber remains constant.

The methods provided herein also may include aligning the CNTs. The CNTs, in embodiments, may be aligned while the suspension of CNTs is disposed in the suspension chamber. The CNTs in the suspension may be aligned with a magnetic force. A magnetic force may be applied to the suspension chamber by one or more magnets or other devices capable of generating a magnetic force that are arranged adjacent to or in the suspension chamber. The CNTs may be exposed to a magnetic force prior to and/or during application of a vacuum force to the filtration area.

The methods provided herein also include contacting the filtration area and the suspension of CNTs in the suspension chamber with at least a portion of a filter paper provided by two or more rollers.

The filtration area may be fixed in the systems herein so that the filter paper supported by the filtration area contacts the suspension of CNTs as the suspension chamber is filled to a particular level. Alternatively, the filtration area may be adjustable within the systems provided herein, thereby requiring the filtration area to be adjusted so that the filter paper supported by the filtration area contacts the suspension of CNTs when the suspension chamber is filled to a particular level. This adjustment may be manually controlled or automated, and may be made before, during, or after the suspension chamber has been filled with a particular amount of the suspension of CNTs.

Initially, a portion of filter paper may be supported by the filtration area before the first portion of the continuous buckypaper paper is produced. If the filter paper is not in position initially, and after each portion of the continuous buckypaper is produced, the filter paper may be advanced by the two or more rollers in order to expose an unused or otherwise desirable portion of the filter paper to the suspension of CNTs in the suspension chamber. In one embodiment, a pinch roller is used to pull the filter paper from the filter paper collection roll, and two guiding rollers ensure that the filter paper is positioned appropriately at the filtration area. The pinch roller may apply tension to the filter paper, and the guiding rollers maybe arranged at particular positions (relative to the filtration area) to ensure that a portion of the filter paper contacts the filtration area in a manner that prevents or at least minimizes the number of CNTs that are not deposited on the filter paper as a vacuum force is applied. In one embodiment, the unusued filter paper is pulled from a first collection roller by a first pinch roller arranged adjacent to the filtration area and a second pinch roller arranged on the opposite side of the filtration area. The first pinch roller and second pinch roller may apply tension to the portion of the filter paper that contact the filtration area. One or both of the pinch rollers of this embodiment may be substituted with guiding rollers that are not capable of applying tension to the buckypaper.

In embodiments, the methods provided herein also include applying vacuum pressure to the filtration area to form a portion of a continuous buckypaper on the filter paper. Any strength of vacuum pressure may be used that is sufficient to [1] form a buckypaper on the portion of the filter paper supported by the filtration area, and [2] avoid damaging the filter paper. The vacuum pressure, for example, may be sufficient to evacuate at least a portion of the nonsolvent from the suspension chamber.

In one embodiment, vacuum pressure is applied after the suspension chamber is filled with a particular level of the suspension of CNTs and nonsolvent. In another embodiment, vacuum pressure is applied while the suspension of CNTs and nonsolvent is transferred from the suspension tank to the suspension chamber.

In one embodiment, vacuum pressure is turned off or reduced after a buckypaper of desired thickness has been formed on the portion of the filter paper supported by the filtration area. The filter paper may then be advanced by two or more rollers in order to expose an unused portion of the filter paper to the suspension of CNTs and nonsolvent. Although turning off or reducing the vacuum pressure may ease the advancement of the filter paper in some embodiments, the filter paper may be advanced while the vacuum pressure is being applied.

In embodiments, the suspension chamber may be filled continuously as vacuum pressure is applied. The suspension chamber may be continuously replenished until a buckypaper of a desirable thickness is formed. In another embodiment, vacuum pressure is applied to form a buckypaper, the vacuum pressured is turned off or reduced as the suspension chamber if refilled, and then vacuum pressure is again applied. These steps may be continued until a buckypaper of a desirable thickness is formed. The need for continuously replenishing the suspension chamber and/or refilling the suspension chamber between applications of vacuum pressure may be reduced or eliminated by employing a suspension having a higher concentration of CNTs.

In embodiments, the methods provided herein include drying the continuous buckypaper. In one embodiment, drying the continuous buckypaper comprises advancing the continuous buckypaper from the filtration area to a drying area. This may be achieved by the two or more rollers of the systems provided herein. The continuous buckypaper may be allowed to remain at the drying area for a time sufficient to remove a desirable amount of the nonsolvent, or the continuous buckypaper may be allowed to remain at the drying area for a time sufficient to form the next portion of the continuous buckypaper at the filtration area. Therefore, the timing of the advancement of the continuous buckypaper may be determined by a desirable drying time, or by the time it takes to form a portion of the continuous buckypaper at the filtration area.

In embodiments, the methods provided herein include separating the continuous buckypaper from the filter paper. The separation may be achieved by any means known in the art. In one embodiment, the continuous buckypaper and filter paper are separated with a knife separator, for example, by passing the continuous buckypaper and filter paper over or along a knife separator. The separator knife may be arranged in the systems provided herein so that it contacts the continuous buckypaper or the filter paper.

In embodiments, the methods provided herein include mechanically stretching at least a portion of the continuous buckypaper. In one embodiment, the mechanical stretching at least substantially aligns at least a portion of the CNTs. The mechanical stretching may be performed on a portion of the continuous buckypaper that has been separated from the filter paper, or a portion of the continuous buckypaper that has not been separated from the filter paper. Therefore, the mechanical stretching step may be performed at any point in the methods provided herein after the continuous buckypaper is formed. For example, a portion of the continuous buckypaper may be subjected to mechanical stretching before, during, or after the continuous buckypaper is advanced to the drying area. In one embodiment, a portion of the continuous buckypaper is subjected to mechanical stretching after it has been separated from the filter paper. The mechanical stretching may be achieved by applying a stretching force to the continuous buckypaper with any means known in the art, including one or more pinch rollers.

In one embodiment, a portion the continuous buckypaper or continuous buckypaper and filter paper are subjected to a mechanical stretching force sufficient to extend the length of the stretched portion of the continuous buckypaper by about 10% to about 65%. In another embodiment, a portion the continuous buckypaper or continuous buckypaper and filter paper are subjected to a mechanical stretching force sufficient to extend the length of the stretched portion of the continuous buckypaper by about 20% to about 60%. In an additional embodiment, a portion the continuous buckypaper or continuous buckypaper and filter paper are subjected to a mechanical stretching force sufficient to extend the length of the stretched portion of the continuous buckypaper by about 40% to about 60%. In a particular embodiment, a portion the continuous buckypaper or continuous buckypaper and filter paper are subjected to a mechanical stretching force sufficient to extend the length of the stretched portion of the continuous buckypaper by about 40%. In yet another embodiment, a portion the continuous buckypaper or continuous buckypaper and filter paper are subjected to a mechanical stretching force sufficient to extend the length of the stretched portion of the continuous buckypaper by about 60%.

In embodiments, the methods provided herein include cross-linking the continuous buckypaper. The continuous buckypapers may be crosslinked by any means known in the art. For example, the CNTs may be crosslinked by exposing the buckypapers to UV irradiation. The UV irradiation may be used to crosslink the CNTs with π-conjugated molecule, such as polydiacetylene. Not wishing to be bound by any particular theory, it is believed that crosslinking the CNTs may enhance electrical conductivity and/or load transfer.

In embodiments, the methods provided herein include continuously monitoring the continuous buckypapers. In embodiments, an in-line Raman characterization setup may be used to characterize and monitor the buckypapers produced by the methods provided herein. The in-line Raman characterization setup may include one or more of the following: a polarizer, an adjustment apparatus, such as a screw, for Z-distance control, an objective lens, and a sample roller. The sample roller may permit the continuously produced buckypapers to be continuously monitored. The in-line Raman system may allow an assessment of quality, functionalization, and alignment of the continuous buckypapers.

In embodiments, the methods provided herein include collecting the continuous buckypaper. The continuous buckypaper, in one embodiment, is collected on a roller. The continuous buckypaper may be collected after it is separated from the filter paper. Alternatively, the continuous buckypaper may be collected without separating it from the filter paper, which may be removed at a later time.

Uses of the Nanoscale Fiber Membranes Made by the Continuous Methods

The continuous buckypapers made by the methods and systems described herein can be used in various applications, including high performance nanocomposite materials for producing thermal management devices and electrical conducting devices, among numerous other multifunctional applications. Examples of applications include lightweight, high performance materials for aerospace composites, lightning strike protection, EMI shielding, directional thermal and electrical conducting applications in materials and devices, and air or water filtration membranes. In one embodiment, the methods are used to make continuous buckypaper materials for constructing long and continuous thermal and electrical paths.

In one embodiment, a method is provided for making nanocomposite material. The method includes the steps of impregnating pores of the continuous buckypapers with a liquid matrix material; and then solidifying the liquid matrix material. The impregnation step can be done by essentially any means which permits or forces the liquid matrix material to infiltrate the pores (e.g., spaces between nanotubes) in the continuous buckypapers.

The infiltration can be achieved with the aid of gravity, vacuum pressure, direct pressure (e.g., hot press techniques), or a combination thereof. In addition, or alternatively, the impregnation process may be facilitated by the use of dilute, low viscosity solutions of the matrix material, to assist the material's penetration into the nanoscale porous structure of the continuous buckypapers. The infiltration can be done in a continuous or batch process.

The step of solidifying the matrix material can be based on a chemical reaction, temperature, pressure, or a combination thereof. In one embodiment, the fluid matrix material comprises a crosslinkable matrix material, and the solidifying step comprises a reaction which crosslinks the matrix material. For example, the fluid matrix material could comprise a matrix material that is a fluid at a temperature below the temperature effective to initiate cross-linking of the matrix material, and then the fluid matrix material could be heated to a temperature and for a time effective to cause the matrix material to crosslink. These methods could be used with thermoset polymers and polymer precursors, such as epoxies.

In one embodiment, a continuous MWNT buckypaper is impregnated with an epoxy or other resin liquid material. The liquid material is then hardened to form a nanotube-reinforced structural material. Such composite materials have a wide range of applications, including those application in which high strength (e.g., as measured by storage modulus) is important.

A wide variety of materials can be used as the matrix material. Selection of the appropriate material depends on the end use of the composite as well as the particular techniques employed to fluidize and solidify the matrix material. Examples of suitable matrix materials include polymers, ceramics, glasses, metals, alloys, and other composites. In one embodiment, the matrix material is polymeric. That is, it comprises one or more oligomers, polymers, copolymers, or blends thereof. In one embodiment, the matrix material comprises a thermoplastic polymer. In another embodiment, the matrix material comprises a thermoset polymer, such as phenol formaldehyde resins and urea formaldehyde resins. Examples of polymers suitable for use in the process include polyolefins, polyesters, nonpeptide polyamines, polyamides, polycarbonates, polyalkenes, polyvinyl ethers, polyglycolides, cellulose ethers, polyvinyl halides, polyhydroxyalkanoates, polyanhydrides, polystyrenes, polyacrylates, polymethacrylates, polyurethanes, and copolymers and blends thereof. In one embodiment, the fluid matrix material comprises a polymer precursor or a crosslinkable material. As used herein, the term "polymer precursor" refers to monomers and macromers capable of being polymerized. As used herein, the term "crosslinkable material" refers to materials that can crosslink with themselves or with another material, such as a functionalized substituent of the CNTs, upon heating or addition of a catalysts or other appropriate initiator. In one preferred embodiment, the polymer precursor comprises an epoxy resin. In another embodiment, the polymer precursor comprises a cyanoacrylate.

The matrix material may further include one or more processing additives. Examples include binding agents, surfactants, and wetting agents.

The present invention is further illustrated by the following example, which is not to be construed in any way as imposing limitations upon the scope thereof. On the contrary, it is to be clearly understood that resort may be had to various other aspects, embodiments, modifications, and equivalents thereof which, after reading the description herein, may suggest themselves to one of ordinary skill in the art without departing from the spirit of the present invention or the scope of the appended claims. Thus, other aspects of this invention will be apparent to those skilled in the art from consideration of the specification and practice of the invention disclosed herein.

Example

A continuous buckypaper material was produced using the system depicted schematically at FIG. 1 and FIG. 2. MWNTs from General Nano, LLC (Cincinnati, Ohio) were disposed in the suspension tank 130 in an amount of acetone sufficient to produce a suspension of CNTs having a concentration of about 50 mg/L.

Portions of the MWNTs and acetone were transferred with a pump to the two sonication units 110 (0.5" Flocell® from Qsonica (Newtown, Conn., USA)), and then returned to the suspension tank. This process was repeated until the MWNTs were substantially evenly dispersed in the acetone, as determined by an in-line dispersion quality analysis setup, which included a Cary 5000 UV-Vis-NIR Spectrophotometer (Agilent Technologies, Santa Clara, Calif., USA), a Beckman Coulter DelsaNano™ C light scattering analysis instrument, and a peristaltic pump.

After determining that the MWNTs were substantially evenly dispersed in the acetone, the suspension of CNTs was pumped continuously to the suspension chamber 220 of the filtration unit 200. Due to the continuous pumping of the suspension of CNTs, the level of the suspension of CNTs in the suspension chamber 220 remained constant due to the fill line 226 that maintained the level of the suspension of CNTs in the suspension chamber by returning excess suspension to the suspension tank 130.

The filter paper used in this example was 6.5 inches wide, 50 feet long, and had a pore size of about 45 micrometers. The unused filter paper was provided by a collection roller 210. The filter paper was pulled from the collection roller 210 and passed through the system, including the pinch roller 260, and started on a second collection roller 280. The second collection roller 280 collected the used filter paper separated from the continuous buckypaper. 275.

The production of the continuous buckypaper was started by applying vacuum force via the vacuum control valve 245 to the filtration area 230. The filtration area included a porous plate that was about 12 inches long, about 7 inches wide, and included a screen portion that was about 6 inches wide. The screen portion, therefore, was slightly narrower than the filter paper 215. The vacuum control valve 245 was controlled by the controller 240.

Vacuum pressure was applied to the filtration area 230 for a time sufficient to deposit an amount of MWNTs on the filter paper sufficient to create a continuous buckypaper having an areal density of about 5 GSM. While maintaining vacuum pressure, the filter paper was advanced via the pinch roller 260, thereby moving the MWNTs deposited on the filter paper to the drying area having substantially raised portions 250. The pinch roller 260 was controlled with a tension control device 265. After a second portion of MWNTs was deposited on the filter paper 215, the filter paper 215 was advanced once more, and the filter paper hosting a buckypaper passed the knife separator 255. At that point, the continuous buckypaper 275 was separated from the filter paper 215, and started on a separate collection roller 270. After starting the continuous buckypaper 275 on the separate collection roller 270, the process was allowed to continue in automated fashion, because the controller 240, in conjunction with the computer 120, controlled the advancement of the filter paper (with the pinch roller 260) and the application of vacuum pressure (with the vacuum control valve 245). After separation, the position of the collection rollers (270, 280) ensured that the angle between the filter paper 215 and continuous buckypaper 275 was between about 70 and about 85 degrees.

The process was allowed to continue until a continuous buckypaper about 30 feet long was produced.

While the present invention may be embodied in many different forms, disclosed herein are specific illustrative embodiments thereof that exemplify the principles of the invention. It should be emphasized that the present invention is not limited to the specific embodiments illustrated or described.

We claim:

1. A method for the continuous manufacture of a buckypaper comprising:
   providing a suspension of carbon nanotubes (CNTs) in a suspension tank,
   transferring the suspension of CNTs in the suspension tank continuously to a suspension chamber of a filtration unit comprising a filtration area, wherein the suspension chamber comprises a fill line configured to return the suspension of CNTs to the suspension tank,
   contacting the filtration area and the suspension of CNTs in the suspension chamber with a first portion of a filter paper provided by two or more rollers,
   applying vacuum pressure to the filtration area to form a portion of a continuous buckypaper on the portion of the filter paper,
   advancing the two or more rollers to contact the filtration area with a second portion of the filter paper, and
   drying the portion of the continuous buckypaper.

2. The method of claim 1, further comprising separating the portion of the continuous buckypaper from the first portion of the filter paper, and collecting the portion of the continuous buckypaper on one or more rollers.

3. The method of claim 1, wherein providing the suspension of CNTs in the suspension tank comprises sonicating CNTs and a nonsolvent in a sonication unit in fluid communication with the suspension tank, and transferring the suspension of CNTs to the suspension tank.

4. The method of claim 1, wherein contacting the filtration area and the suspension of CNTs in the suspension chamber with at least a portion of the filter paper comprises advancing at least one of the two or more rollers.

5. The method of claim 1, wherein drying the portion of the continuous buckypaper comprises advancing at least one of the two or more rollers to position the portion of the continuous buckypaper in a drying area comprising a material having a surface comprising substantially raised portions that contact the filter paper.

6. The method of claim 1, wherein the portion of the continuous buckypaper has an areal density of from about 1 GSM to about 10 GSM.

7. The method of claim 1, wherein at least one of providing, transferring, contacting, applying, advancing, and drying, is automated and controlled by a microcontroller.

8. The method of claim 1, further comprising exposing the portion of the continuous buckypaper to UV irradiation of a wavelength and duration sufficient to cross-link two or more CNTs of the portion of the continuous buckypaper.

9. The method of claim 1, further comprising aligning the CNTs.

10. The method of claim 9, wherein aligning comprises exposing the suspension of CNTs to a magnetic force, an electrical field, or a combination thereof.

11. The method of claim 9, wherein aligning comprises mechanically stretching the portion of the continuous buckypaper.

12. The method of claim 1, further comprising continuously characterizing and monitoring the suspension of CNTs.

13. The method of claim 1, further comprising continuously monitoring the continuous buckypaper with an in-line Raman characterization setup.

14. A system for the continuous manufacture of buckypaper materials comprising:
   a suspension tank containing a suspension of carbon nanotubes (CNTs), and
   a filtration unit comprising (i) a suspension chamber in fluid communication with the suspension tank via a connecting tube and a fill line configured to return excess suspension of CNTs from the suspension chamber to the suspension tank, (ii) a filter paper associated with two or more rollers, (iii) a filtration area associated with a vacuum pump, (iv) a drying area, and (v) a roll for collecting a continuous buckypaper.

15. The system of claim 14, further comprising a sonication unit in fluid communication with the suspension tank.

16. The system of claim 14, further comprising a microcontroller.

17. The system of claim 14, further comprising a Micro PLC Controller which controls filter paper movement.

18. The system of claim 14, further comprising a vacuum suspension valve for controlling the vacuum pump.

19. The system of claim 14, further comprising an in-line Raman characterization setup.

20. The system of claim 14, further comprising a UV irradiation source.

* * * * *